United States Patent
Liu et al.

(10) Patent No.: US 10,067,369 B2
(45) Date of Patent: Sep. 4, 2018

(54) DISPLAY APPARATUS WITH A PRISM MODULE INCLUDING A CORNER PRISM SET DISPOSED ON A CORNER REGION

(71) Applicant: CHAMP VISION DISPLAY INC., Hsinchu County (TW)

(72) Inventors: Chin-Ku Liu, Hsin-Chu (TW); Jhong-Hao Wu, Hsin-Chu (TW); Fa-Chih Liu, Hsin-Chu (TW)

(73) Assignee: CHAMP VISION DISPLAY INC., Hsinchu County (TW)

( * ) Notice: Subject to any disclaimer, the term of this patent is extended or adjusted under 35 U.S.C. 154(b) by 0 days.

(21) Appl. No.: 15/250,890

(22) Filed: Aug. 29, 2016

(65) Prior Publication Data

US 2017/0131584 A1     May 11, 2017

(30) Foreign Application Priority Data

Nov. 6, 2015    (TW) ............................... 104136597 A
Jul. 26, 2016   (TW) ............................... 105123534 A

(51) Int. Cl.
*G02F 1/1333*   (2006.01)
*G02F 1/1335*   (2006.01)

(52) U.S. Cl.
CPC .... *G02F 1/13336* (2013.01); *G02F 1/133308* (2013.01); *G02F 1/133526* (2013.01); *G02F 2001/13332* (2013.01)

(58) Field of Classification Search
CPC .. G02F 1/1333; G02F 1/1335; G02F 1/13336; G02F 1/133308; G02F 1/133526; G02F 2001/13332
See application file for complete search history.

(56) References Cited

U.S. PATENT DOCUMENTS

| 7,134,778 B2 | 11/2006 | Kazuhiro et al. |
| 9,612,468 B1 | 4/2017 | Liu et al. |

(Continued)

FOREIGN PATENT DOCUMENTS

| CN | 1661444 | 8/2005 |
| CN | 101206327 | 6/2008 |

(Continued)

OTHER PUBLICATIONS

"Office Action of Taiwan Counterpart Application", dated Dec. 6, 2016, p. 1-p. 6.

*Primary Examiner* — Jennifer D. Carruth
(74) *Attorney, Agent, or Firm* — JCIPRNET

(57) ABSTRACT

A display apparatus including a display device having a display area and a frame area surrounding the display area, a prism module and a transparent element is provided. The corner regions of the frame are adjacent to the corners of the display area respectively. The prism module includes at least one corner prism set disposed on at least one of the corner regions. The transparent element is disposed between the display device and the prism module, and covers the corner regions. The transparent element includes a light entering surface facing the display device, a light exiting surface, and a plurality of side surfaces connected with the light entering surface and the light exiting surface. At least one of the side surfaces located in the corner regions is an inclined surface. The light entering surface connected to the inclined surface is retracted in a direction toward the display area.

18 Claims, 8 Drawing Sheets

(56) References Cited

U.S. PATENT DOCUMENTS

| | | | |
|---|---|---|---|
| 9,851,480 | B2 | 12/2017 | Liu et al. |
| 2003/0231144 | A1 | 12/2003 | Cho et al. |
| 2004/0071417 | A1 | 4/2004 | Veligdan |
| 2009/0059366 | A1* | 3/2009 | Imai .................. G02B 27/2242 359/464 |
| 2014/0218971 | A1 | 8/2014 | Wu |
| 2015/0092442 | A1 | 4/2015 | Wu |
| 2015/0116852 | A1 | 4/2015 | Kim et al. |
| 2017/0131583 | A1* | 5/2017 | Liu ....................... G02B 5/045 |

FOREIGN PATENT DOCUMENTS

| | | |
|---|---|---|
| CN | 201502963 | 6/2010 |
| CN | 102346326 | 2/2012 |
| CN | 102637388 | 8/2012 |
| CN | 102854644 | 1/2013 |
| CN | 202837794 U | 3/2013 |
| CN | 101593473 | 6/2013 |
| CN | 203644317 | 6/2014 |
| CN | 103988118 | 8/2014 |
| CN | 105100658 | 11/2015 |
| CN | 102087814 | 4/2016 |
| JP | 2008060061 | 3/2008 |
| JP | 2013195458 | 9/2013 |
| TW | 200541334 | 12/2005 |
| TW | 200846774 | 12/2008 |
| TW | M358323 | 6/2009 |
| TW | 200938913 | 9/2009 |
| TW | 201319685 | 5/2013 |
| TW | 201341864 | 10/2013 |
| TW | 201403177 | 1/2014 |
| TW | 201432351 | 8/2014 |
| TW | 201447836 | 12/2014 |
| TW | 201513074 | 4/2015 |
| TW | I507787 | 11/2015 |
| WO | 2010124542 | 11/2010 |
| WO | 2013134621 | 9/2013 |
| WO | 2015133488 | 9/2015 |

* cited by examiner

DISPLAY APPARATUS WITH A PRISM MODULE INCLUDING A CORNER PRISM SET DISPOSED ON A CORNER REGION

CROSS-REFERENCE TO RELATED APPLICATION

This application claims the priority benefits of Taiwan application serial no. 104136597, filed on Nov. 6, 2015, and Taiwan application serial no. 105123534, filed on Jul. 26, 2016. The entirety of each of the above-mentioned patent applications is hereby incorporated by reference herein and made a part of specification.

BACKGROUND OF THE INVENTION

1. Field of the Invention

The present invention relates to a display apparatus, and more particularly, to a spliced display apparatus without seams.

2. Description of Related Art

The large screen display systems have been widely used in the plurality of fields such as telecommunications network management, public security and traffic police command, traffic monitoring and management, military operational command training, industrial production scheduling, it can focus on displaying various signals of different sources to meet user's demand for large-area displaying of various sharing information and general information. Furthermore, the generally related application of splicing a plurality of display screens to achieve a larger display screen has shown up in each fields. For now, in order to achieve a large-screen display system or general display screen splicing, using a plurality of liquid crystal displays (LCD) as display unit to achieve splicing belongs to the common method.

After many years of development of the liquid crystal displays, it has become the mainstream of the displays. The advantage of the liquid crystal displays lies in it's thin thickness, light weight, low energy consumption, long lifetime, and radiation-free, and the display of the liquid crystal display is exquisite, high resolution, each of the performances of the key performance indicators is excellent. However, although the liquid crystal display has the advantages mentioned above, based on the operation principle of the liquid crystal display, the invalid area of the LCD panel and the front frame mechanism limits are difficult to avoid. When a plurality of liquid crystal displays is used to achieve the multi-screen display splicing, the frames are formed between the display screen of the liquid crystal displays, so that the overall display is discontinuous and the viewing quality is affected. Therefore, the current multi-display screen splicing products on the market can't achieve the seamless splicing between the display screens.

The information disclosed in this "Description of Related Art" section is only for enhancement of understanding of the invention and therefore it may contain information that does not form the prior art that is already known to a person of ordinary skill in the art. The information disclosed in this "Description of Related Art" section does not mean that the information or the problems to be resolved by one or more embodiments of the invention were acknowledged by a person of ordinary skill in the art.

SUMMARY OF THE INVENTION

The invention provides a display apparatus which can achieve the borderless display effect, and the dark area situation won't occur at the corner of the display apparatus. In addition, the display apparatus has a thinner thickness.

The other objectives and advantages of the invention can be further understood through the technical features disclosed in the invention.

In order to achieve at least one of the above-mentioned objectives, one embodiment of the present invention is directed to a display apparatus including a display device, a prism module, and a transparent element. The display device has a display area and a frame area surrounding the display area. The display area includes a plurality of corners, the frame area includes a plurality of corner regions, and the corner regions are adjacent to the corners respectively. The prism module includes at least one corner prism set. Each of the at least one corner prism set is disposed on one of the corner regions respectively. The transparent element is disposed between the display device and the prism module and covering the corner regions. The transparent element includes a light entering surface facing the display device, a light exiting surface opposite to the light entering surface, and a plurality of side surfaces connected to the light entering surface and the light exiting surface. At least one of the side surfaces located in the corner regions is an inclined surface. The light entering surface connected to the inclined surface is retracted in a direction toward the display area, and the inclined surface and the light exiting surface have an inclined angle therebetween.

Based on the above, the embodiments of the invention have at least one of the advantages or effects below. In the display apparatus of the embodiment of the invention, Each of the corner prism sets of the prism module is disposed on one of the corner regions respectively, and the transparent element is disposed between the display device and the prism module and covering the corner regions. In addition, at least one of the side surfaces of the transparent element located in the corner region is inclined surface. The light entering surface connected to the inclined surface is retracted in a direction toward the display area, and an inclined angle is provided between the inclined surface and the light exiting surface. Therefore, the image light of the display device can forward emit through the transparent element and the prism module at the top of the frame area of the display device, so as to achieve the borderless display effect, and the dark area situation won't occur at the corner of the display apparatus. In addition, because the inclined surface can adjust the transmission direction of the image light, the thickness of the transparent element can be designed to be thinner, so as to make the display apparatus have a thinner thickness.

In order to make the aforementioned and other features and advantages of the invention more comprehensible, embodiments accompanying figures are described in detail belows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiment, reference is made to the accompanying drawings which form a part hereof, and in which are shown by way of illustration specific embodiment in which the invention may be practiced. In this regard, the directional terminologies, such as "top", "bottom", "left", "right", "front", or "back", etc., are used with reference to the orientation of the Figure(s) being described. Accordingly, the drawings and descriptions will be regarded as illustrative in nature and not as restrictive.

Figure 1A:
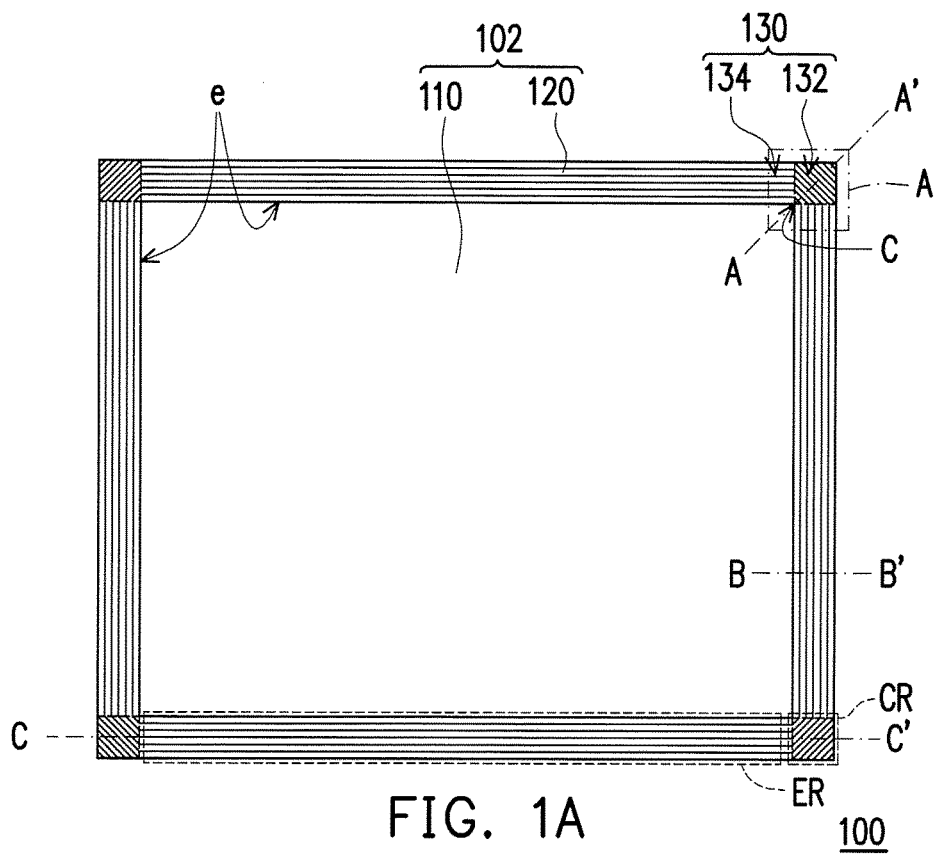
FIG. 1A is a top schematic diagram illustrating a display apparatus according to an embodiment of the present invention.

FIG. 1A is a top schematic diagram illustrating a display apparatus according to an embodiment of the present invention. Please referring to FIG. 1A. In the present embodiment, the display apparatus 100 includes display device 102. The display device 102 has a display area 110 and a frame area 120 surrounding the display area 110. Specifically, the display device 102 is liquid crystal display (LCD), for example. The display area 110 has a plurality of display pixel (not shown) for displaying the display image, and the frame area 120 is used as the non-display area of the display device 102. In some embodiments, the display device 102 can also be other types of display device such as organic light emitting display (OLED), the present invention is not limited thereto.

Figure 1B:
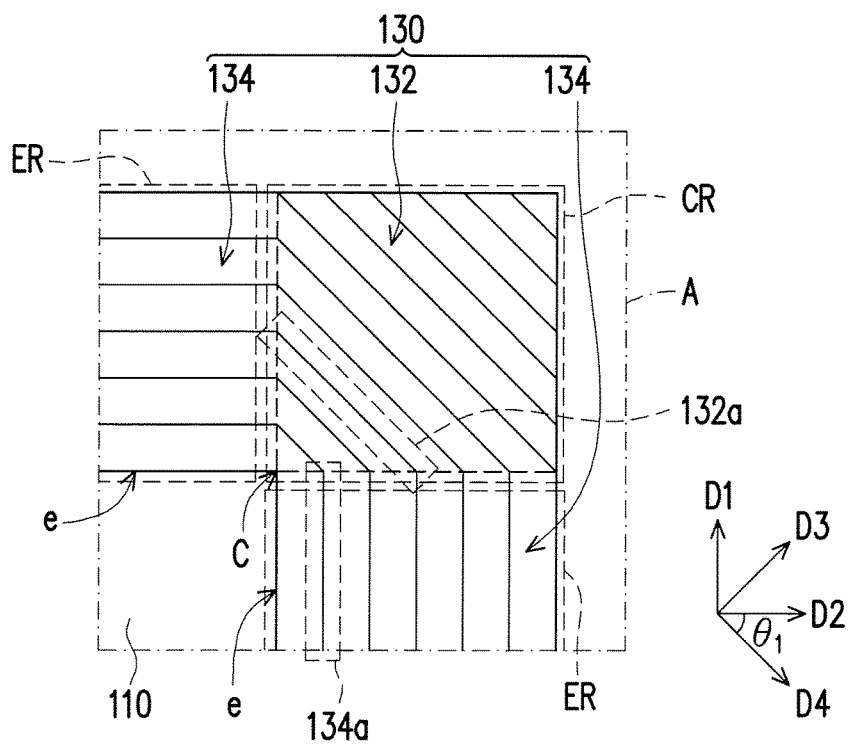
FIG. 1B is an enlarged schematic diagram illustrating a display apparatus of the embodiment of FIG. 1A in region A.

FIG. 1B is an enlarged schematic diagram illustrating a display apparatus of the embodiment of FIG. 1A in region A. Please referring to FIG. 1A and FIG. 1B simultaneously. In the embodiment, the display apparatus 100 further includes a prism module 130, disposed on the frame area 120. Specifically, the display area 110 includes a plurality of corners C. The frame area 120 includes a plurality of corner regions CR, and the corner regions CR are adjacent to the corners C respectively. The prism module 130 includes at least one corner prism set 132, and each of the at least one corner prism set 132 is disposed on one of the corner regions CR respectively. In the embodiment, the frame area 120 includes four corner regions CR, the prism module 130 includes four corner prism sets 132, and the corner prism sets 132 are disposed on the corner regions CR respectively. However, in some embodiments, the prism module 130 can include corner prism sets 132 of other number, and the corner prism sets 132 are disposed on part of or all of the corner regions CR, the invention is not limited thereto.

In the embodiment, the display area 110 further includes a plurality of edges e, located in the junction between the display area 110 and the frame area 120. The frame area further includes a plurality of edge regions ER, and the edge regions ER are adjacent to the edges e respectively. Specifically, the prism module 130 further includes a plurality of edge prism sets 134. The edge prism sets 134 are disposed on the edge regions ER respectively, and disposed next to the edges e of the display area 110 respectively. In the embodiment, the frame area 120 includes four edge regions ER, the prism module 130 includes four edge prism sets 134, and the edge prism sets 134 are disposed on the edge regions ER respectively. In addition, each of the corner prism sets 132 are located between two of the adjacent edge prism sets 134. Each of the corners C is located on the junction between the two adjacent edges e, each of the corner prism sets 132 is disposed next to each of the corners C respectively, and each of the corner prism sets 132 is connected to the adjacent edge prism sets 134. In the embodiment, the corner prism sets 132 and the edge prism sets 134 cover the frame area 120. However, in some embodiments, the corner prism sets 132 and the edge prism sets 134 can cover the frame area 120 and part of the display area 110 simultaneously, the invention is not limited thereto.

Please referring to FIG. 1B. In an embodiment, each of the edge prism sets 134 includes a plurality of prisms 134a, the prisms 134a are arranged along a direction away from the display area 110, and the extending directions of each of the prisms 134a of each of the edge prism sets 134 is substantially paralleled to the edge e of the adjacent display area 110. Use the edge prism set 134 connected beneath the corner prism set 132 according to FIG. 1B as an example, the prisms 134a of the edge prism set 134 are arranged along the direction D2, for example, wherein the direction D2 is away from the direction of display area 110. Each of the prisms 134a of the edge prism set 134 is extended along the direction D1, and the direction D1 is substantially paralleled to the edge e of the display area 110 adjacent to the edge prism set 134. And so on, the prisms 134a of the edge prism set 134 adjacent to the left of the corner prism set 132 in FIG. 1B are arranged along a direction D1, wherein the direction D1 is a direction away from the display area 110. Each of the prisms 134a of the edge prism set 134 is extended along the direction D2, and the direction D2 is substantially paralleled to the edge e of the display area 110 adjacent to the edge prism set 134.

In the embodiment, each of the corner prism sets 132 includes a plurality of prisms 132a, and the prisms 132a are arranged along an arrangement direction away from the corner C of the display area 110. In addition, the extending direction of each of the prisms 132a is inclined with respect to the edges e adjacent to the corner C in the display area 110. Specifically, the prisms 132a of the corner prism set 132 are arranged along a direction D3, for example, wherein the direction D3 is a direction away from the corner C of the display area 110. Each of the prisms 132a of the corner prism set 132 is extended along the direction D4, for example, and the direction D4 is inclined with respect to the edges e adjacent to the corner C in the display area 110. In the embodiment, the acute angle between the direction D4 and the edges e adjacent to the corner C in the display device 110 is $\theta_1$. The angle $\theta_1$ is greater than or equal to 15 degrees and less than or equal to 75 degrees. For example, the angle $\theta_1$ is preferably 45 degrees. In some embodiments, the angle $\theta_1$ can also be other values, the invention is not limited thereto. In addition, in the present embodiment, the corner prism sets 132 are connected to the adjacent edge prism sets 134. Specifically, both ends of each prism 132a of the corner prism set 132 are connected to one prism 134a of an adjacent edge prism set 134 respectively. However, in some embodiments, the corner prism sets 132 can also not be connected to the adjacent edge prism sets 134, the invention is not limited thereto.

Figure 1C:
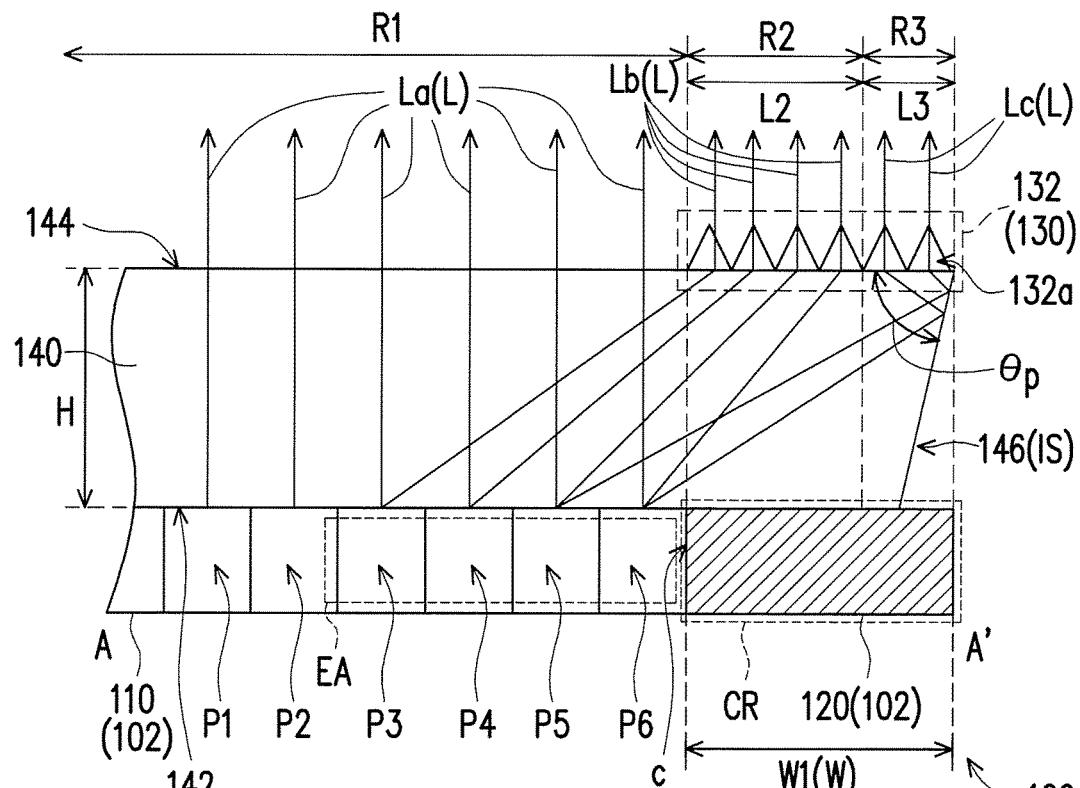
FIG. 1C is a cross sectional schematic diagram illustrating a display apparatus of the embodiment of FIG. 1A in the junction (along line A-A') between the corner of the display area and the frame area.
Figure 1D:
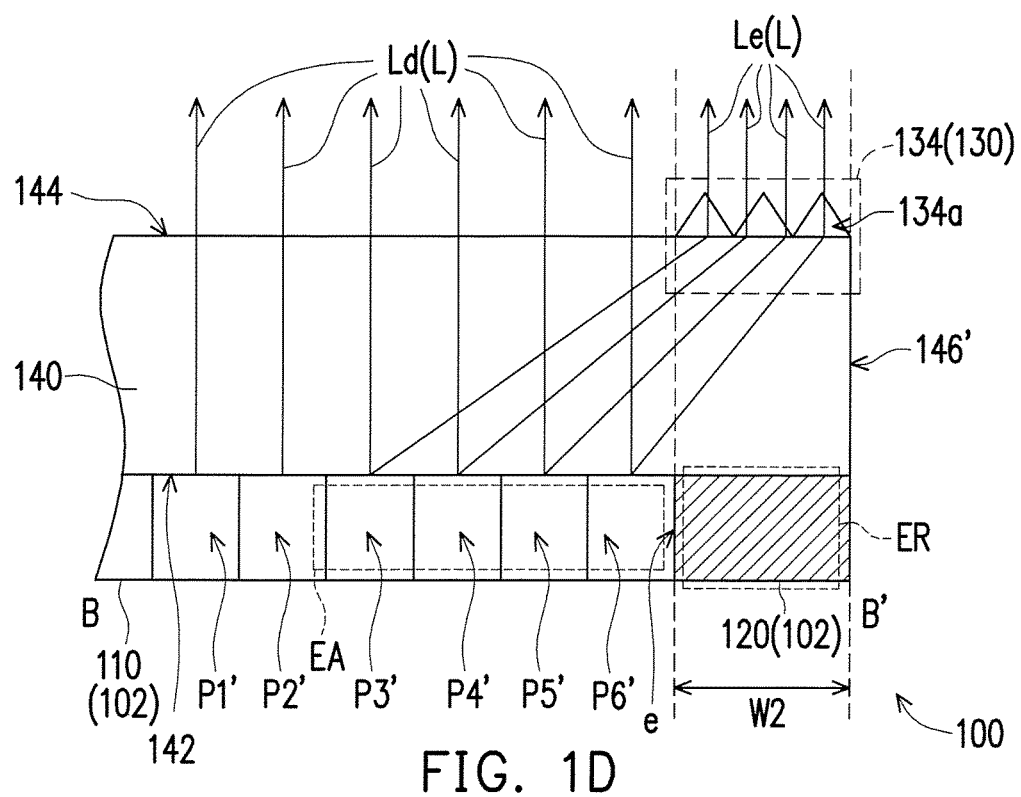
FIG. 1D is a cross sectional schematic diagram illustrating a display apparatus of the embodiment of FIG. 1A in the junction (along line B-B') between the edge of the display area and the frame area.

FIG. 1C is a cross sectional schematic diagram illustrating a display apparatus of the embodiment of FIG. 1A in the junction (along line A-A') between the corner of the display area and the frame area, and FIG. 1D is a cross sectional schematic diagram illustrating a display apparatus of the embodiment of FIG. 1A in the junction (along line B-B') between the edge of the display area and the frame area. Please referring to both FIG. 1C and FIG. 1D. In the embodiment, the peak of each of the prisms 132a of each of the corner prism sets 132 faces a direction away from the display device 102, and the peak of each of the prisms 134a of each of the edge prism sets 134 faces a direction away from the display device 102. Specifically, the prism module 130 is positive prism sheet. However, in other embodiments, the prism module 130 can also be optical film or lenses of other types, like a turning film, for example. For example, the prism module 130 can be inverse prism sheet. In the embodiment, the peak of each of the prisms 132a of each of the corner prism sets 132 faces the display device 102, and the peak of each of the prisms 134a of each of the edge prism sets 134 faces the display device 102. In the related embodiments of the invention, the appropriate prism module 130 can be chosen according to the practical optical demand, so as to design the appropriate prisms 132a of the corner prism set 132 and the prisms 134a of the edge prism set 134, the invention is not limited thereto.

Then, please referring to both FIG. 1A and FIG. 1C. In the embodiment, the display apparatus 100 further includes a transparent element 140 disposed between the display device 102 and the prism module 130 and covering the corner regions CR. The transparent element 140 includes a light entering surface 142 facing the display device 102, a light exiting surface 144 opposite to the light entering surface 142, and a plurality of side surfaces 146 connected to the light entering surface 142 and the light exiting surface 144. In addition, at least one of the side surfaces 146 located in the corner regions CR is an inclined surface IS. The light entering surface 142 connected to the inclined surface IS is retracted a direction toward the display area 110, and an inclined angle $\theta_p$ is provided between the inclined surface IS and the light exiting surface 144. Specifically, the inclined angle $\theta_p$ is less than 90 degrees, and falls in a range between 65 degrees and 88 degrees, for example. Preferably, the inclined angle $\theta_p$ is 83 degrees. However, in other embodiments, the inclined angle $\theta_p$ can also be appropriately configured according to the practical display demand. In addition, in the embodiment, the transparent element 140 is a transparent plate or support element of other types, and the prism module 130 is supported by the transparent element 140. Specifically, the prism module 130 is glued on the transparent element 140, and the transparent element 140 is at least partially glued on the display device 102. However, in other embodiments, the prism module 130 can also be fixed by the frame or internal fixation element of the display device 102, the invention is not limited thereto.

Please referring to FIG. 1C, specifically, the light exiting surface 144 has a first light exiting region R1, a second light exiting region R2, and a third light exiting region R3. The first light exiting region R1 is located on the display area 110, and the third light exiting region R3 is located on the frame area 120. In addition, the second light exiting region R2 is located between the first light exiting region R1 and the third light exiting region R3, and the prism module 130 is located on the second light exiting region R2. In the embodiment, the second light exiting region R2 is located on the frame area 120. However, in some embodiments, the second light exiting region R2 is located on the junction between the display area 120 and the frame area 110. That is, a portion of the second light exiting region R2 is located on the display area 120, and other portion of the second light exiting region R2 is located on the frame area 110. In addition, in the embodiment, the prism module 130 is further located on the third light exiting region R3. However, in some embodiments, there is no prism module 130 on the third light exiting region R3 of the light exiting surface 144, the invention is not limited thereto.

In the embodiment, the display area 110 has an edge area EA, and the edge area EA is a region of the display area 110 close to the frame area 120. The junction between the display area 110 and the corner region CR has a plurality of pixels, so as to display the display image. In the following paragraphs, the pixel P1, pixel P2, pixel P3, pixel P4, pixel P5, and pixel P6 are used for exemplarily illustration of the transmission condition of the image light L transmitted by the display device 102 of the display apparatus 100. In the embodiment, the pixel P3, pixel P4, the pixel P5, and the pixel P6 are located in the edge area EA, and the pixel P1 and the pixel P2 are located outside the edge area EA. In the embodiment, the display device 102 is used to provide the image light L. The first portion of the image light L emits through the first light exiting region R1, a second portion of the image light L emits through the second light exiting region R2 and enters the prism module 130, and a third portion of the image light L emits through the third light exiting region R3 after being reflected by the inclined surface IS (side surface 146).

Specifically, the image light L provided by the pixel P3, the pixel P4, the pixel P5, and the pixel P6 in the edge area EA and the pixels P1, P2 disposed adjacent to the outside of the edge area EA includes partial image lights emitting toward different angles. In the embodiment, the image light L includes the image light La, the image light Lb and the image light Lc. Specifically, the image light La is the first portion of the image light L, and the image light La is the portion of the lights emitted by the pixels with a smaller emitting angle range in the normal direction of the display area 110. After being emitted by the pixels, the image light La is transmitted forward to the right top of the display area 110, and emitted through the first light exiting region R1. In addition, the image light Lb is the second portion of the image light L, and the image light Lb is the portion of the lights emitted by the pixels with a larger emitting angle range in the normal direction of the display area 110. Specifically, after being emitted by the pixel P3, the pixel P4, the pixel P5 and the pixel P6 in the edge area EA, the image light Lb is obliquely transmitted to the top of the corner region CR, emitted through the second light exiting region R2, and entering the corner prism set 132 of the prism module 130. The image light Lb entering the corner prism set 132 is refracted by the prisms 132a and the transmission direction thereof is changed, so as to transmit forward to the top of the corner region CR. The image light Lc is the third portion of the image light L, and the image light Lc is the portion of the lights emitted by the pixels with a further larger emitting angle range. In the past, due to the large oblique degree between the pixel P5, pixel P6 in the edge area EA and the third light exiting region R3, if the image light Lc obliquely transmits to third light exiting region R3 directly for emitting and enters the corner prism set 132 of the prism module 130 on the third light exiting region R3 after emitting through the pixel P5, pixel P6, because the angle of the transformation from the incident light to the forward emitting light achieved by the prisms 132a of the corner prism set 132 has its limitations, consequently, the image light Lc (not shown) emitted by the pixels P5, P6 in the edge area EA is mostly emitted in a non-forward emitting way through the corner prism set 132 or reflected by the structure of the prisms 132a of the corner prism set 132, so that the image light Lc (not shown) is not forward emitted through the corner prism set 132 of the prism module 130 on the third light exiting region R3 and the dark area without the image is formed. In the embodiment, the side surface 146 of the transparent element 140 located in the corner regions CR is inclined surface IS. When the image light Lc is emitted from the pixel P5 and the pixel P6 in the edge area EA, the image light Lc is obliquely transmitted to the inclined surface IS (side surface 146) of the transparent element 140. The image light Lc is emitted through the third light exiting region R3 after the reflection by the inclined surface IS. In the embodiment, the image light Lc enters the corner prism set 132 of the prism module 130 on the third light exiting region R3 after the emission from the third light exiting region R3. The image light Lc entering the corner prism set 132 is refracted by the prism 132a, and the transmission direction thereof is changed. And then, the image light Lc refracted by the prisms 132a is forward transmitted to the top of the corner region CR. Therefore, the image light emitted by the pixel P5 and pixel P6 in the edge area EA can be provided to the top of the third light exiting region R3 of the corner region CR of the frame area 120, so as to make the third light exiting regions R3 able to display the display image.

Because oblique degree between the pixel P3, P4 in the edge area EA and the third light exiting region R3 is greater than the oblique degree between the pixel P5, P6 in the edge area EA and the third light exiting region R3, consequently, the image light Lc (not shown) emitted by the pixels P3, P4 in the edge area EA is obliquely transmitted to the inclined surface IS (side surface 146) of the transparent element 140 in a greater angle, and emitted to the corner prism set 132 of the prism module 130 on the third light exiting region R3 from the third light exiting region R3 after the reflection of the inclined surface IS. Because the angle of transformation from the incident light to the forward emitted light achieved by the prisms 132a of the corner prism set 132 has its limitations, consequently, the image light Lc (not shown) emitted by the pixels P3, P4 in the edge area EA is mostly emitted in a non-forward emitting way through the corner prism set 132 or reflected by the structure of the prisms 132a of the corner prism set 132.

Similarly, because oblique degree between the pixels P1, P2 disposed adjacent to the outside of the edge area EA and the second light exiting region R2 and the third light exiting region R3 is greater than the oblique degree between the pixels P3, P4, P5, and P6 in the edge area EA and the second light exiting region R2 and the third light exiting region R3, the image light Lb (not shown) and image light Lc (not shown) emitted by the pixels P1, P2 disposed adjacent to the outside of the edge area EA enter the corner prism set 132 of the prism module 130 on the second light exiting region R2 and the third light exiting region R3. Because the angle of transformation from the incident light to the forward emitted light achieved by the prisms 132a of the corner prism set 132 has its limitations, consequently, the image light Lb (not shown) and the image light Lc (not shown) emitted by the pixels P1, P2 disposed adjacent to the outside of the edge area EA is mostly emitted in a non-forward emitting way through the corner prism set 132 or reflected by the structure of the prisms 132a of the corner prism set 132.

In the embodiment, the image light La emitted by the pixel P1, pixel P2 located outside the edge area EA and the pixel P3, pixel P4, pixel P5, and pixel P6 located in the edge area EA can be forward transmitted to the right top of the display area 110. In addition, the image light Lb emitted by the pixel P3, pixel P4, pixel P5 and pixel P6 located in the edge area EA is refracted by the prisms 132a and forward transmitted to the top of the corner region CR, and the image light Lc emitted by the pixel P5 and pixel P6 is forward transmitted to the top of the corner region CR by the refraction of the prisms 132a after being reflected by the inclined surface IS. Therefore, the image light emitted by the pixels in the edge area EA can be provided to the top of the corner regions CR of the frame area 120, so as to make corner regions CR able to display the display image. That is, the display area 110 and the frame area 120 of the display apparatus 100 are both able to be used to display the image.

In the embodiment, the display image of the corner region CR (frame area 120) corresponding to the second light exiting region R2 is the same with the display image of a portion of the display area 110, and the display image of the corner region CR (frame area 120) corresponding to the third light exiting region R3 is also the same with the display image of a portion of the display area 110. However, in some of the embodiments, the appropriate optical element can be disposed according to the practical demands, so that a portion of the image light emitted by the pixels located in the display area 110 forms into the display image of the frame area 120 through the corner prism set 132, and the image light emitted by the pixels is not forward transmitted to the top of the display area 110, so as to make the display image of the corner region CR (frame area 120) different from the display image of the display area 110, the invention is not limited thereto.

Then, please referring to both FIG. 1A and FIG. 1D. In the embodiment, the transparent element 140 further covers the edge regions ER. A plurality of pixels is provided on the junction between the display area 110 and the edge region ER. In the following paragraphs, the pixel P1', pixel P2', pixel P3', pixel P4', pixel P5', and pixel P6' are used for exemplarily illustration of the transmission condition of the image light L transmitted by the display device 102 of the display apparatus 100. In the embodiment, the pixel P3', pixel P4', the pixel P5', and the pixel P6' are located in the edge area EA, and the pixel P1' and the pixel P2' are located adjacent to the outside of the edge area EA. In the embodiment, the pixel P1', pixel P2', pixel P3', pixel P4', pixel P5' and pixel P6' emit the image light Ld. The image light Ld is the fourth portion of the image light L, for example, and the image light Ld is the portion of the lights emitted by the pixels with a smaller emitting angle range. After being emitted by the pixels, the image light Ld is transmitted forward to the right top of the display area 110. In addition, pixel P3', pixel P4', pixel P5' and pixel P6' also emit the image light Le. The image light Le is the fifth portion of the image light L, for example, and the image light Le is the portion of the lights emitted by the pixels with a larger emitting angle range. After being emitted by the pixels, the image light Le is obliquely transmitted to the top of the edge region ER. Then, the obliquely transmitted image light Le is refracted by the prisms 134a of the edge prism set 134 located on the top of the edge region ER, and the transmission direction thereof is changed. And then, the image light Le refracted by the prisms 134a is forward transmitted to the top of the edge region ER. Similarly, because oblique degree between the pixels P1', P2' disposed adjacent to the outside of the edge area EA and the edge region ER is greater than the oblique degree between the pixels P3', P4', P5', and P6' in the edge area EA and the edge area EA, the image light Le (not shown) emitted by the pixels P1', P2' disposed adjacent to the outside of the edge area EA is mostly emitted in a non-forward emitting way through the corner prism set 132 or reflected by the structure of the prisms 132a of the corner prism set 132. Therefore, in the embodiment, the edge regions ER of the frame area 120 can also display the display image, so that the display area 110 and the frame area 120 of the display apparatus 100 are both able to be used to display the image.

Please referring to both FIG. 1C and FIG. 1D again, and referring to FIG. 1A correspondingly. In the embodiment, the prisms 132a of the corner prism set 132 and the prisms 134a of the edge prism set 134 can refract the image light with a specific incident angle, so as to make the image light forward transmitted to the top of the frame area 120. Generally, the light bending angle able to be achieved by the prisms 132a and the prisms 134a has its limitations. For instance, the prism module 130 is positive prism sheet, and each of the prisms 132a and the prisms 134a is a prism with two base angles of 45 degrees and an apex angle of 90 degrees. Under this structure, the prisms 132a and the prisms 134a can bend the image light with an incident angle of about 22 degrees, so that the image light is forward transmitted to the top of the frame area 120.

However, in the embodiment, in the cross-sectional schematic diagram of FIG. 1C, the corner region CR (frame area 120) has a width W1, in the cross-sectional schematic diagram of FIG. 1D, the edge region ER (frame area 120) has a width W2, and the width W1 is greater than the width W2. Under the circumstance of the transparent element 140 having a fixed thickness H, the distance between the region of the light exiting surface 144 closer to the edge of the transparent element 140 and the pixel of the display area 110 close to the corner C in FIG. 1C is greater than the distance between the region of the light exiting surface 144 closer to the edge of the transparent element 140 and the pixel of the display area 110 close to the edge e in FIG. 1D. Specifically, the distance between the third light exiting region R3 on the corner region CR in FIG. 1C and the pixel P6 is greater than the light exiting surface 144 region on the edge region ER and the pixel P6' in FIG. 1D. In addition, the oblique degree of the region of the light exiting surface 144 closer to the edge of the transparent element 140 with respect to the pixel of the display area 110 close to the corner C in FIG. 1C is greater than the oblique degree of the region of the light exiting surface 144 closer to the edge of the transparent element 140 with respect to the pixel of the display area 110 close to the edge e in FIG. 1D. Specifically, the oblique degree of the third light exiting region R3 with respect to the pixel P6 in FIG. 1C is greater than oblique degree of the light exiting surface 144 region on the edge region ER with respect to the pixel P6' in FIG. 1D. That is, the incident angle of the image light emitted by the pixel P6 directly entering the prisms 132a on the third light exiting region R3 is greater than the incident angle of the image light emitted by the pixel P6' directly entering the prisms 134a on the edge region ER.

In the embodiment, the side surface 146 located on the corner region CR is a inclined surface IS. In addition, the light entering surface 142 connected to the inclined surface IS is retracted a direction toward the display area 110, and the inclined surface IS and the light exiting surface 144 have an inclined angle θ therebetween. Therefore, the image light Lc emitted by the pixel of the display area 110 close to the corner C, such as the pixel P5 and pixel P6, can enter the prisms 132a with a smaller incident angle after being reflected by the inclined surface IS. In such a way, although the third light exiting region R3 is very inclined with respect to the pixel of the display area 110 close to the corner C in FIG. 1C, however, the image light Lc emitted by the pixel of the display area 110 close to the corner C, such as the pixel P5 and pixel P6, can still be forward transmitted through the third light exiting region R3. Therefore, in the embodiment, when the viewer is looking at the display apparatuses 100 according to FIG. 1G, the viewer can see the image light Lc emitted by pixel P5 and pixel P6 at the third light exiting region R3. That is, the dark area situation won't occur at the corner of the display apparatus 100 (corresponding to the corner region CR of the display device 102), so that the display apparatus 100 can achieve better borderless display effect.

Moreover, in the embodiment, the oblique degree of the third light exiting region R3 with respect to the pixel P5 and pixel P6 don't have to be decreased by increasing the thickness H of the transparent element 140 in FIG. 0.1C, so as to decrease the incident angle of the image light emitted by the pixel P5 and pixel P6 directly entering the prisms 132a. Relatively speaking, the image light Lc emitted by the pixel P5 and pixel P6 can enter the prisms 132a with a smaller incident angle after being reflected by the inclined surface IS, so as the make the image light emitted through the right top of the third light exiting region R3. That is, the inclined surface IS can adjust the transmission direction of the image light Lc, so that the image light Lc has an appropriate incident angle with respect to the prisms 132a. Therefore, the occurrence of the dark area situation at the corner of the display apparatus 100 don't have to be avoided by increasing the thickness H of the transparent element 140 in the display apparatus 100 of the embodiment. The thickness H of the transparent element 140 of the embodiment can be designed to be thinner, so as to make the display apparatus 100 have a thinner thickness.

Figure 1E:
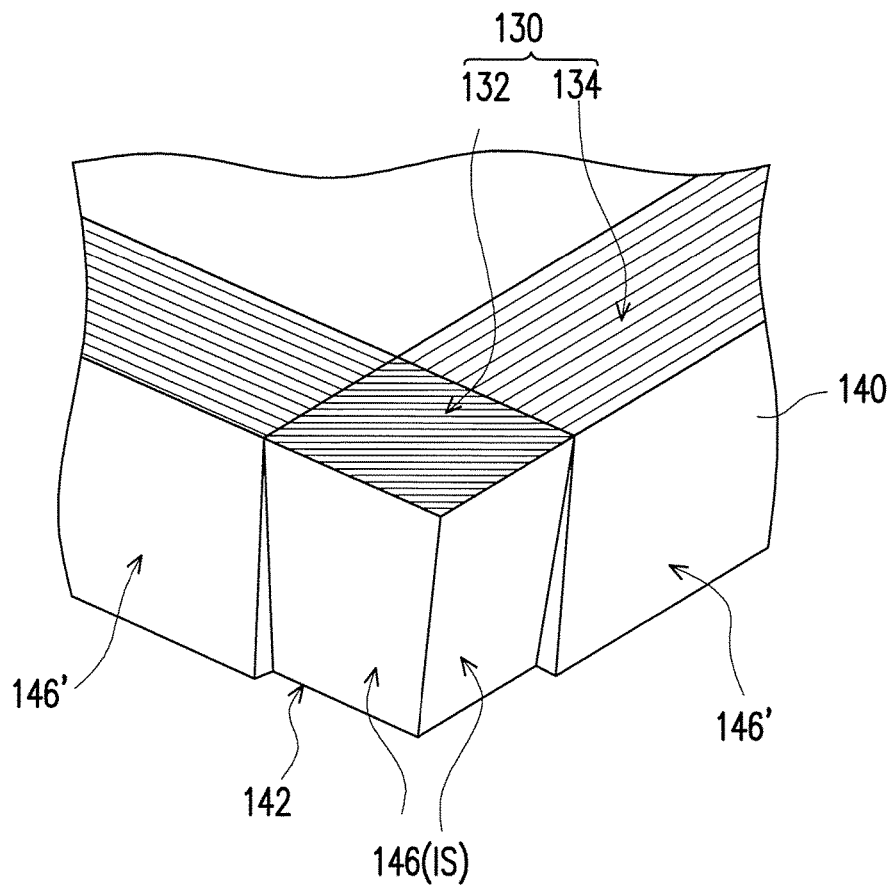
FIG. 1E is a schematic three-dimensional diagram illustrating a portion of the display apparatus according to the embodiment of FIG. 1A.

FIG. 1E is a schematic three-dimensional diagram illustrating a portion of the display apparatus according to the embodiment of FIG. 1A. Please referring to FIG. 1E and referring to FIG. 1A correspondingly. Specifically, in the embodiment, the side surface 146' located on the edge region ER is not the inclined surface, and the light entering surface 142 connected to the side surface 146' is not retracted toward the direction toward the display area 110, that is, the side surface 146' and the light entering surface 142 are connected perpendicularly. However, in other embodiments, the side surface 146' located on the edge region ER can also be the inclined surface IS similar to the side surface 146, and a portion of the image light can be refracted by the prisms 134a and forward transmitted to the top of the edge region ER after the reflection on the inclined surface IS. In addition, in the embodiments, the oblique degree of the side surface 146' located on the edge region ER can be the same with the side surface 146 located on the corner region CR, for example. In such a way, when the transparent element 140 of the embodiment are being manufactured, the side surfaces 146 and the side surfaces 146' on the same side of the transparent element 140 don't have to be manufactured separately. Relatively, the side surfaces 146 and the side surfaces 146' can be manufactured entirely so that the manufacturing process of the transparent element 140 can be simplified. However, in other embodiments, the oblique degree of the side surface 146' located on the edge region ER can be designed to be different from the oblique degree of the side surface 146 located on the corner region CR according to the practical image displaying demands, the invention is not limited thereto.

Figure 1F:
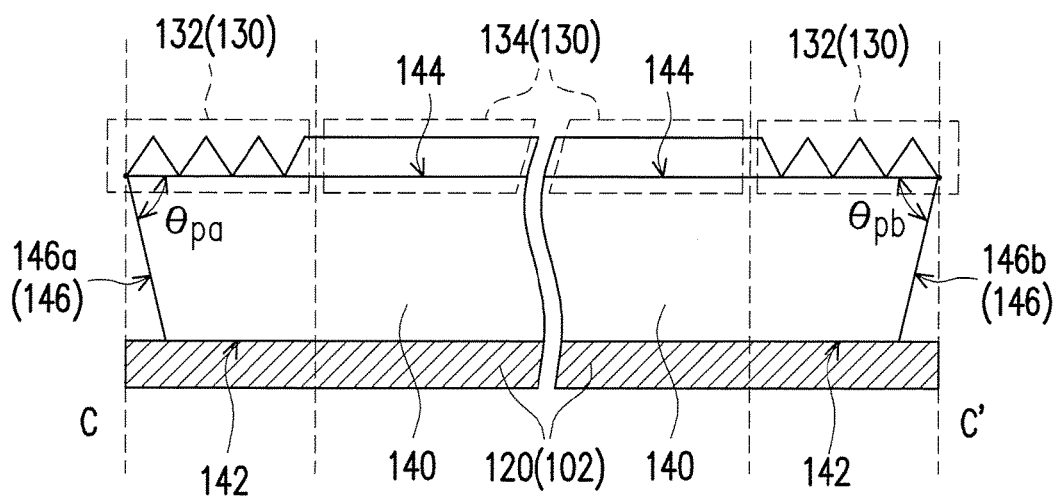
FIG. 1F is a cross sectional schematic diagram illustrating the display apparatus of the embodiment of FIG. 1A along the line line C-C'.

FIG. 1F is a cross sectional schematic diagram illustrating the display apparatus of the embodiment of FIG. 1A along the line C-C'. Please referring to FIG. 1F and referring to FIG. 1A correspondingly. In the embodiment, at least two opposite side surfaces of the side surfaces 146 of the transparent element 140 are the inclined surface IS respectively, and the light entering surface 142 connected to the inclined surface IS is retracted in a direction toward the display area 110. In addition, an inclined angle is provided between the inclined surface IS and the light exiting surface 144. Specifically, the side surface 146a and side surface 146b opposite to each other among the side surfaces 146 located in the corner region CR are inclined surfaces IS respectively. The light entering surface 142 connected to the side surface 146a is retracted the direction toward the display area 110, and the light entering surface 142 connected to the side surface 146b is also retracted the direction toward the display area 110. In addition, an inclined angle $\theta_{pa}$ is provided between the side surface 146a and the light exiting surface 144, and the inclined angle $\theta_{pb}$ is provided between the side surface 146b and the light exiting surface 144. In the embodiment, the side surface 146a and the side surface 146b of the transparent element 140 are symmetry to each other, and the inclined angle $\theta_{pa}$ is equal to the inclined angle $\theta_{pb}$. However, in some embodiments, the inclined angle $\theta_{pa}$ can be designed to be different from the inclined angle $\theta_{pb}$ according to the practical demands, the invention is not limited thereto.

Figure 1G:
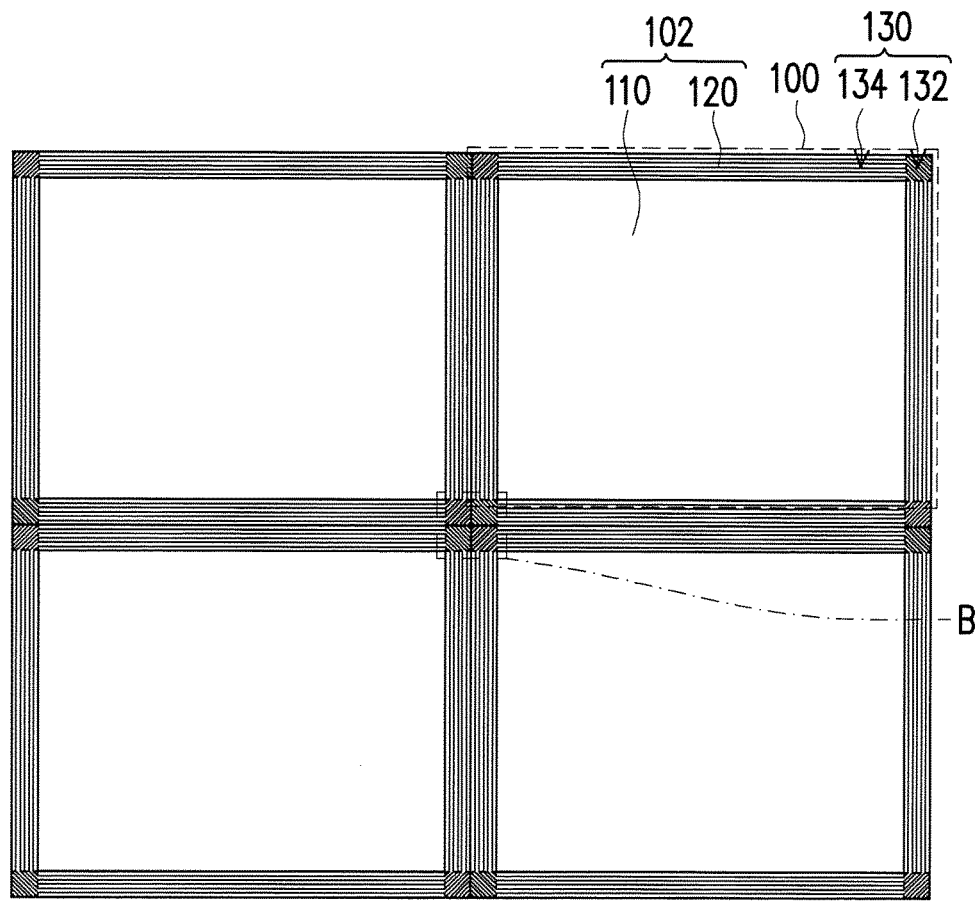
FIG. 1G is a top schematic diagram illustrating an embodiment of the present invention illustrating splicing using the plurality of display apparatuses of the embodiment of FIG. 1A.
Figure 1H:
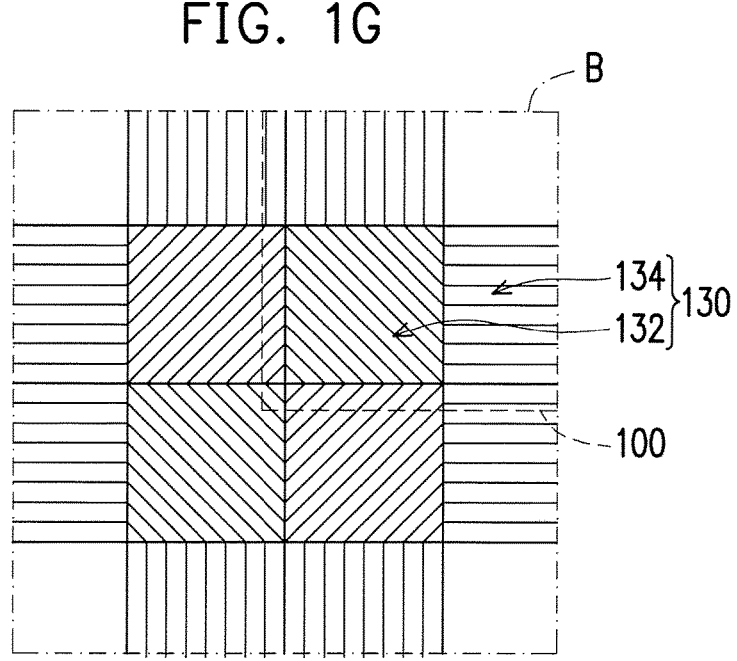
FIG. 1H is an enlarged schematic diagram illustrating a display apparatus of the embodiment of FIG. 1G in region B.

FIG. 1G is a top schematic diagram illustrating an embodiment of the present invention illustrating splicing using the plurality of display apparatuses of the embodiment of FIG. 1A. FIG. 1H is an enlarged schematic diagram illustrating a display apparatus of the embodiment of FIG. 1G in region B. Please referring to both FIG. 1G and FIG. 1H, and referring to FIG. 1A correspondingly. In the embodiment, four display apparatuses 100 are spiced in a 2×2 method, so as to achieve the display effect of larger display image. However, in some embodiments, the splicing can be achieved by using other types of display apparatus, and other types of the splicing method can be performed on the display apparatuses, the invention is not limited thereto. In the embodiment, the corner prism set 132 refracts the image light emitted by the display area 110 accompanying the inclined surface IS located in the corner region CR so that the image light is forward transmitted to the top of the corner region CR, so as to make a portion of the frame area 120 (that is, corner region CR) adjacent to the corner C of the display area 110 also able to display the display image. In addition, the edge prism set 134 refracts the image light emitted by the display area 110 so that the image light is forward transmitted to the top of the edge region ER, so as to make a portion of the frame area 120 (that is, edge region ER) adjacent to the edge e of the display area 110 also able to display the display image. Therefore, the display area 110 of the display apparatus 100 and the frame area 120 used as a non-display area originally are both able to be used to display the image so that the display apparatus 100 can achieve the borderless display effect. In the embodiment, when the viewer is looking at the display apparatuses 100 according to FIG. 1G, the viewer won't see the frame of the display apparatuses 100.

Figure 2A:
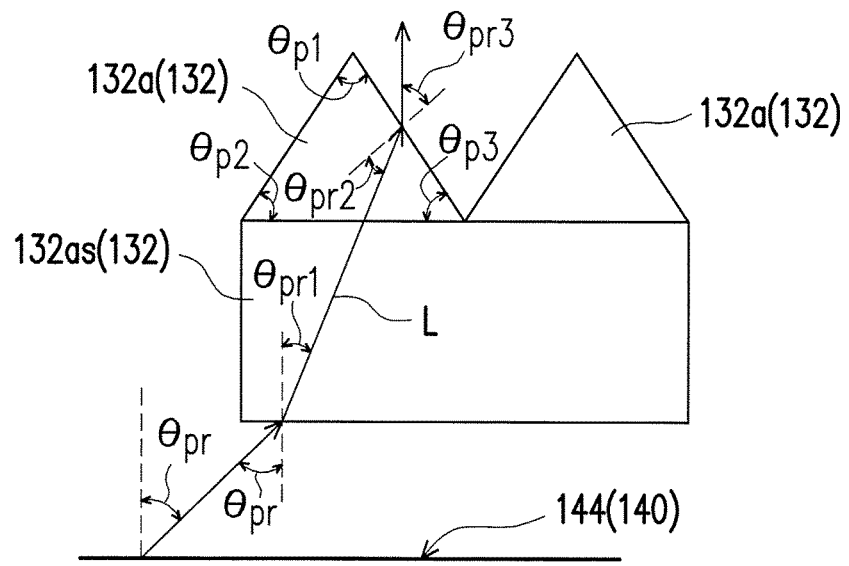
FIG. 2A is a light path schematic diagram illustrating an image light of a display apparatus of the embodiment of FIG. 1A passing through the corner prism set.
Figure 2B:
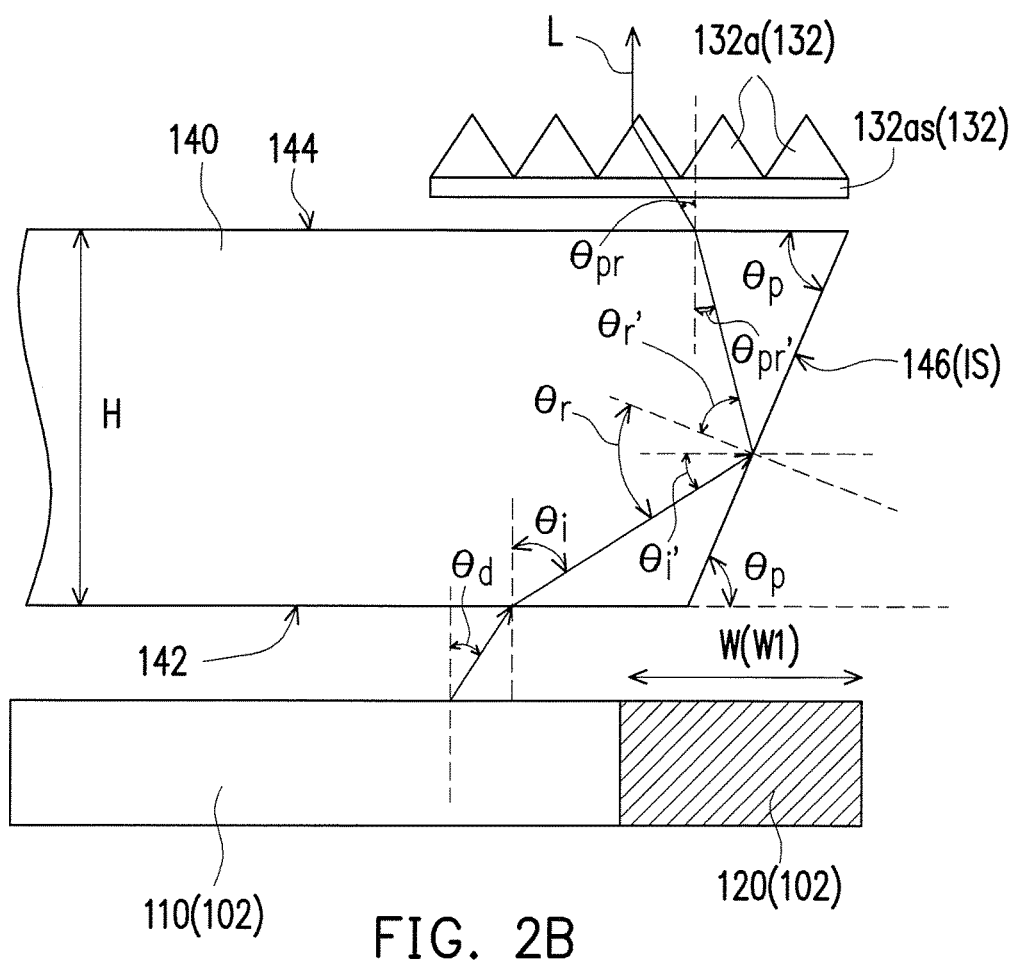
FIG. 2B is a light path schematic diagram illustrating an image light of a display apparatus of the embodiment of FIG. 1A.

FIG. 2A is a light path schematic diagram illustrating an image light of a display apparatus of the embodiment of FIG. 1A passing through the corner prism set. FIG. 2B is a light path schematic diagram illustrating an image light of a display apparatus of the embodiment of FIG. 1A. Some of the elements in FIG. 2A and FIG. 2B are illustrated as the exploded diagram so that the light path (such as the light path of the image light Lc in FIG. 1C) of a portion of the image light L of the display apparatus is illustrated, and the relation between the inclined angle $\theta_p$ of the transparent element 140 and the thickness H of the transparent element 140 is exemplarily illustrated. Please referring to FIG. 2A first, in the embodiment, the corner prism set 132 includes a prism sheet substrate 132as and the above prisms 132a. The image light L entering the prism sheet substrate 132as has an incident angle $\theta_{pr}$, and the image light L entering the prism sheet substrate 132as has a refraction angle $\theta_{pr1}$. An apex angle of the prism 132a of the corner prism set 132 has an angle $\theta_{p1}$, and two base angles of the prism 132a have an angle $\theta_{p2}$ and angle $\theta_{p3}$ respectively. In addition, the image light L leaving the prism 132a has an incident angle $\theta_{pr2}$, and the image light L leaving the prism 132a has a refraction angle $\theta_{pr3}$. Then, please referring to FIG. 2B, in the embodiment, the incident angle of the image light L from the display area 110 entering the light entering surface 142 has an angle $\theta_d$, the refraction angle of the image light L entering the light entering surface 142 has an angle $\theta_i$. The incident angle of the image light L reflected on the inclined surface IS (side surface 146) has an angle $\theta_r$, and the reflection angle of the image light L reflected on the inclined surface IS has an angle $\theta_{r'}$. In addition, the angle of the image light L emitting toward the inclined surface IS and the horizontal plane (such as the plane paralleled to the light entering surface 142) has an angle $\theta_{i'}$.

Please referring to FIG. 2A again, in the embodiment, the image light L from the display area 110 can be emitted through the top of the corner prism set 132 after passing through the corner prism set 132. Specifically, the image light L passing through the corner prism set 132 is emitted in a direction perpendicular to the light exiting surface 144 (or the light entering surface 142), for example. In addition, if the prism 132a has a structure of isosceles triangle, that is, the angle $\theta_{p2}$ is equal to the angle $\theta_{p3}$, and $\theta_{p1} = 180 - \theta_{p2} - \theta_{p3}$, then the following correlation can be obtained:

$$\theta_{p3} = \frac{(180 - \theta_{p1})}{2} \tag{1}$$

In addition, because the angle $\theta_{pr3}$ is equal to the angle $\theta_{p3}$, and $np \times \sin(\theta_{pr2}) = na \times \sin(\theta_{pr3})$, then the following correlation can be obtained:

$$\theta_{pr2} = a\sin\left(\frac{na \times \sin(\theta_{pr3})}{np}\right) \quad (2)$$

Wherein, na is the refractive index of air, and np is the refractive index of the prism sheet substrate 132*as*.

In addition, because $\sigma_{pr1} = \theta_{pr3} - \theta_{pr2}$, and $np \times \sin(\theta_{pr1}) = na \times \sin(\theta_{pr})$ then the following relation ship can be obtained:

$$\theta_{pr} = a\sin\left(\frac{np \times \sin(\theta_{pr1})}{na}\right) \quad (3)$$

Based on the above correlation (1) to (3), the following correlation can be obtained:

$$\theta_{pr} = a\sin\left(\frac{np \times \sin\left(\frac{(180-\theta_{p1})}{2} - \left(a\sin\left(\frac{na \times \sin\left(\frac{(180-\theta_{p1})}{2}\right)}{np}\right)\right)\right)}{na}\right) \quad (4)$$

Specifically, when $\theta_{p1}$ is 90 degrees, for example, the refractive index of air na is 1. When the refractive index of the prism sheet substrate 132*as* is 1.52, for example, the angle $\theta_{pr}$ is 26.8 degrees. That is, the corner prism set 132 can transform the image light L entering in 26.8 degrees into forward transmission.

Then, please referring the FIG. 2B again, in the embodiment, because $na \times \sin(\theta_{pr}) = nc \times \sin(\theta_{pr'})$ then the following correlation can be obtained:

$$\theta_{pr'} = a\sin\left(\frac{na \times \sin(\theta_{pr})}{nc}\right) \quad (5)$$

wherein nc is the refractive index of the transparent element 140.

In addition, because $\theta_r = 90 - (\theta_{pr'} + (90 - \theta_p))$, $\theta_i = \theta_r = \theta_p - \theta_{pr'}$, and $\theta_i = \theta_r - (90 - \theta_p)$, then the following correlation can be obtained:

$$\theta_i = 90 - \theta_r = 90 - (\theta_r - (90 - \theta_p)) = 180 - \theta_r, \theta_p = 180 - 2 \times \theta_p + \theta_{pr'} \quad (6)$$

In addition, because $na \times \sin(\theta_d) = nc \times \sin(\theta_i)$ then the following correlation can be obtained:

$$\theta_d = a\sin\left(\frac{nc \times \sin(\theta_i)}{na}\right) \quad (7)$$

Based on the above correlation (5) to (7), the following correlation can be obtained:

$$\theta_d = a\sin\left(\frac{nc \times \sin\left(180 - 2 \times \theta_p + a\sin\left(\frac{na \times \sin(\theta_{pr})}{nc}\right)\right)}{na}\right) \quad (8)$$

For instance, when the material of the transparent element 140 is polymethylmethacrylate (PMMA), the angle $\theta_{pr}$ is 26.8 degrees, $\theta_p$ is 83 degrees, the refractive index nc is 1.49, for example, and the angle $\theta_d$ is 51.3 degrees. That is, when the image light L from the display area 110 enters the light entering surface 142 in an angle of 51.3 degrees, the corner prism set 132 can transform the image light L into forward transmission.

If the transparent element 140 doesn't have the inclined surface IS, then angle of the image light L able to be used by the corner prism set 132 is $\theta_{pr}$, that is, 26.8 degrees. In addition, under the circumstance of the frame area 120 having the width W, the thickness H of the transparent element 140 and the angle $\theta_p$, have the following correlation:

$$H = \frac{W}{\tan\left(a\sin\left(\frac{\sin(\theta_{pr})}{nc}\right)\right)} \quad (9)$$

When the width W is 4 millimeter, for example, and the angle $\theta_p$, is 26.8 degrees, the thickness H of the transparent element 140 is 12.6 millimeter.

In addition, in the embodiment, the transparent element 140 has the inclined surface IS, so the angle of the image light L able to be used by the corner prism set 132 is $\theta_d$, that is, 51.3 degrees. Under the circumstance of the frame area 120 having the width. W, the thickness H of the transparent element 140 and the angle $\theta_d$ has the following correlation:

$$H = \frac{W}{\tan\left(a\sin\left(\frac{\sin(\theta_d)}{nc}\right)\right)} \quad (10)$$

When the width W is 4 millimeter, for example, and the angle $\theta_d$ is 51.3 degrees, the thickness H of the transparent element 140 is 6.5 millimeter.

Specifically, because the transparent element 140 of the embodiment has the inclined surface IS, the transparent element 140 can merely adopt the thickness H of 6.5 millimeter. Compared to the circumstance of the transparent element 140 not having the inclined surface IS (thickness H is 12.6 millimeter), the thickness of the transparent element 140 of the embodiment can be reduced by about half of the original thickness.

Furthermore, please referring to FIG. 1C again. In the embodiment, at one of the corner regions CR and the display area 110 adjacent to the corner region CR, the display apparatus 100 meets:

$$L2+L3 \leq H*\cot(\theta)+W,$$

wherein L2 is the width of the second light exiting region R2 on the arrangement direction (such as the direction D3 of FIG. 1B), L3 is the width of the third light exiting region R3 on the arrangement direction. In addition, H is the thickness H of the transparent element 140, 0 is the third portion of the image light L, such as the incident angle of the image light Lc entering the prism module 130 (like the $\theta_{pr}$ of FIG. 2A and FIG. 2B). Furthermore, W is the width W of the frame area 120 on the arrangement direction. However, in other embodiments, the width L2, width L3, thickness H, angle $\theta_p r$ and the width W can also have other correlations or corresponding values, the invention is not limited thereto.

Figure 3A:
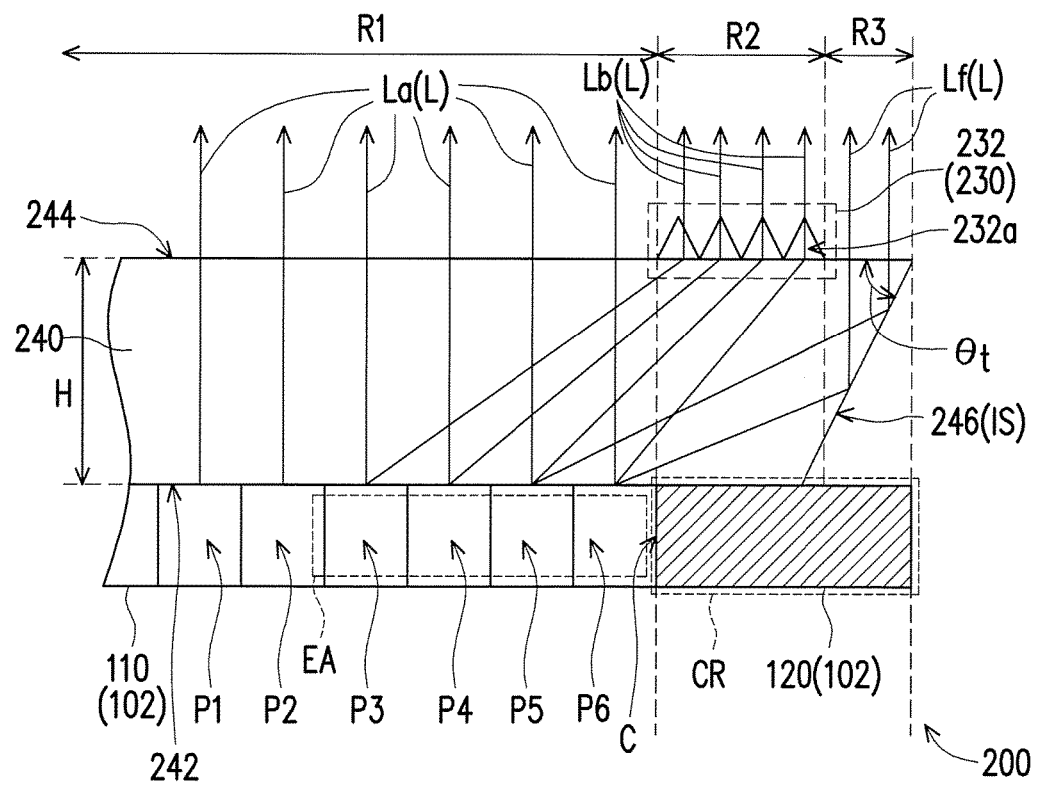
FIG. 3A is a cross sectional schematic diagram illustrating a display apparatus of another embodiment of the present invention in the junction between the corner of the display area and the frame area.
Figure 3B:
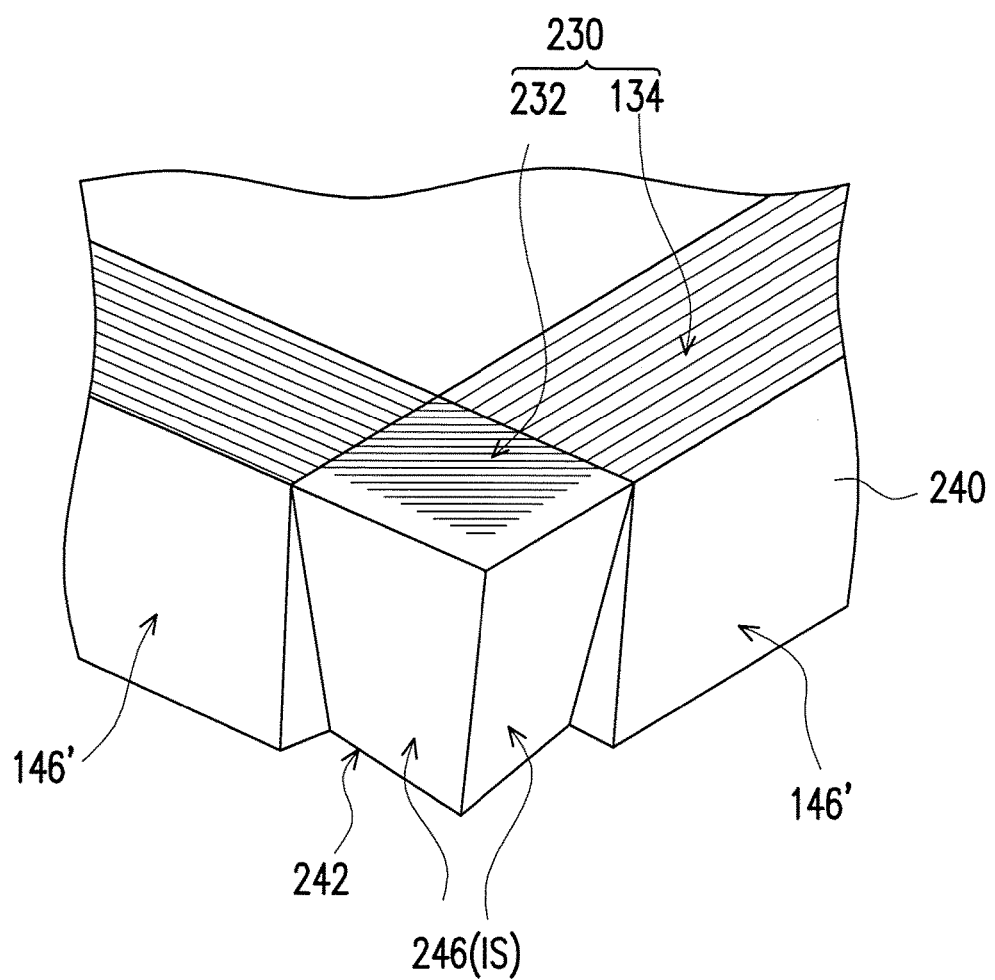
FIG. 3B is a schematic three-dimensional diagram illustrating a portion of the display apparatus according to the embodiment of FIG. 3A.

FIG. 3A is a cross sectional schematic diagram illustrating a display apparatus of another embodiment of the present invention in the junction between the corner of the display area and the frame area. FIG. 3B is a schematic three-dimensional diagram illustrating a portion of the display apparatus according to the embodiment of FIG. 3A. Please referring to FIG. 3A and FIG. 3B. In the embodiment, the display apparatus 200 is similar to the display apparatus 100 in FIG. 1A. The components of the display apparatus 200 and the related descriptions can reference to the display apparatus 100 of FIG. 1A, and will not be repeated herein. The difference between the display apparatus 200 and the display apparatus 100 are described as below. In the embodiment, the transparent element 240 of the display apparatus 200 includes a light entering surface 242 facing the display device 102, a light exiting surface 244 opposite to the light entering surface 242, and a plurality of side surfaces 246 connected to the light entering surface 242 and the light exiting surface 244. At least one of the side surfaces 246 located in the corner regions CR is an inclined surface IS. The light entering surface 242 connected to the inclined surface IS is retracted a direction toward the display area 110, and an inclined angle $\theta_r$ is provided between the inclined surface IS (side surface 246) and the light exiting surface 244. Specifically, the inclined angle $\theta_r$ is less than 90 degrees, and falls in a range between 45 degrees and 85 degrees, for example. Preferably, the inclined angle $\theta_r$ is 72 degrees. However, in other embodiments, the inclined angle $\theta_r$ can also be appropriately configured according to the practical display demand, the invention is not limited thereto.

Please referring to FIG. 3A, in the embodiment, the display apparatus 200 includes the prism module 230. The prism module 230 includes at least one corner prism set 232 disposed on at least one of the corner regions CR. In addition, the light exiting surface 244 of the display apparatus 200 has a first light exiting region R1, a second light exiting region R2, and a third light exiting region R3 similar to those on the light exiting surface 144 in the embodiment of FIG. 1A, and the prism module 230 is located on the second light exiting region R2. However, in the embodiment, the prism module 230 is not disposed on the third light exiting region R3. Specifically, the third light exiting region R3 defines the region where the prism module 230 is not provided. At one of the corner regions CR and the display area 110 adjacent to the corner region CR, the width of the third light exiting region R3 on the arrangement direction (like the direction D3 of FIG. 1B) is greater than 0 and less than or equal to the width of the frame area 120 on the arrangement direction.

In the following paragraphs, the pixel P1, pixel. P2, pixel P3, pixel P4, pixel P5, and pixel P6 are used for exemplarily illustration of the transmission condition of the image light L transmitted by the display device 102 of the display apparatus 200. Specifically, the image light La emitted by the pixel P1, pixel P2, pixel P3, pixel P4, pixel P5, and pixel P6 emits through the first light exiting region R1, and the image light Lb emitted by the pixel P3, pixel P4, pixel P5, and pixel P6 emits through the second light exiting region R2 and enters the corner prism set 232 after the refraction by the prisms 232a of the corner prism set 232. The image light La and the image light Lb are the first portion and the second portion of the image light L respectively. The transmission path of the image light La and the image light Lb are similar to the transmission path of the image light La and the image light Lb in the embodiment of FIG. 1C, and are not repeated herein. In addition, the pixel P5 and pixel P6 also emits the image light Lf, and the image light Lf is the third portion of the image light L. The image light Lf is obliquely transmitted to the inclined surface IS (side surface 246) of the transparent element 240 after the emission from the pixels. The image light Lf is emitted through the third light exiting region R3 after the reflection by the inclined surface IS. Specifically, the emitting direction of the image light Lf at the third light exiting region R3 is perpendicular to the light exiting surface 244, that is, the image light Lf is forward transmitted to the top of the corner region CR.

In the embodiment, the image light La emitted by the pixel P1, pixel P2 located outside the edge area EA and the pixel P3, pixel P4, pixel P5, and pixel P6 located in the edge area EA can be forward transmitted to the right top of the display area 110. In addition, the image light Lb emitted by the pixel P3, pixel P4, pixel P5 and pixel P6 located in the edge region EA is refracted by the prisms 232a and forward transmitted to the top of the corner region CR, and the image light Lf emitted by the pixel P5 and pixel P6 is forward transmitted to the top of the corner region CR after being reflected by the inclined surface IS (side surface 246). Therefore, the image light emitted by the pixels in the edge area EA can be provided to the top of the corner regions CR of the frame area 120, so as to make the corner regions CR able to display the display image. In addition, the display apparatus 200 can also forward transmits the image light emitted by the pixels located on the display area 110 to the top of the edge region ER through the edge prism set 134 (as illustrated in FIG. 3B) on the top of the transparent element 240 and the edge region ER. The transmission path of the image light forward transmitted to the top of the edge region ER in the embodiment is similar to the transmission path of the image light Le in the embodiment of FIG. 1D, and are not repeated herein. Specifically, the edge regions ER of the frame area 120 can also display the display image.

In the embodiment, because the corner region CR and the edge region ER are both able to be used to display the display image, the display area 110 of the display apparatus 200 and the frame area 120 used as a non-display area originally are both able to be used to display the image so that the display apparatus 200 can achieve the borderless display effect similar to the display apparatus 100. In addition, because the image light (like the image light Lf) emitted by the pixel of the display area 110 close to the corner C can be forward transmitted through the third light exiting region R3, the dark area situation won't occur at the corner of the display apparatus 200 (corresponding to the corner region CR of the display device 102), so that the display apparatus 200 can achieve better borderless display effect. In addition, the thickness H of the transparent element 240 of the display apparatus 200 can be designed to be thinner, so as to make the display apparatus 200 have a thinner thickness.

Figure 4:
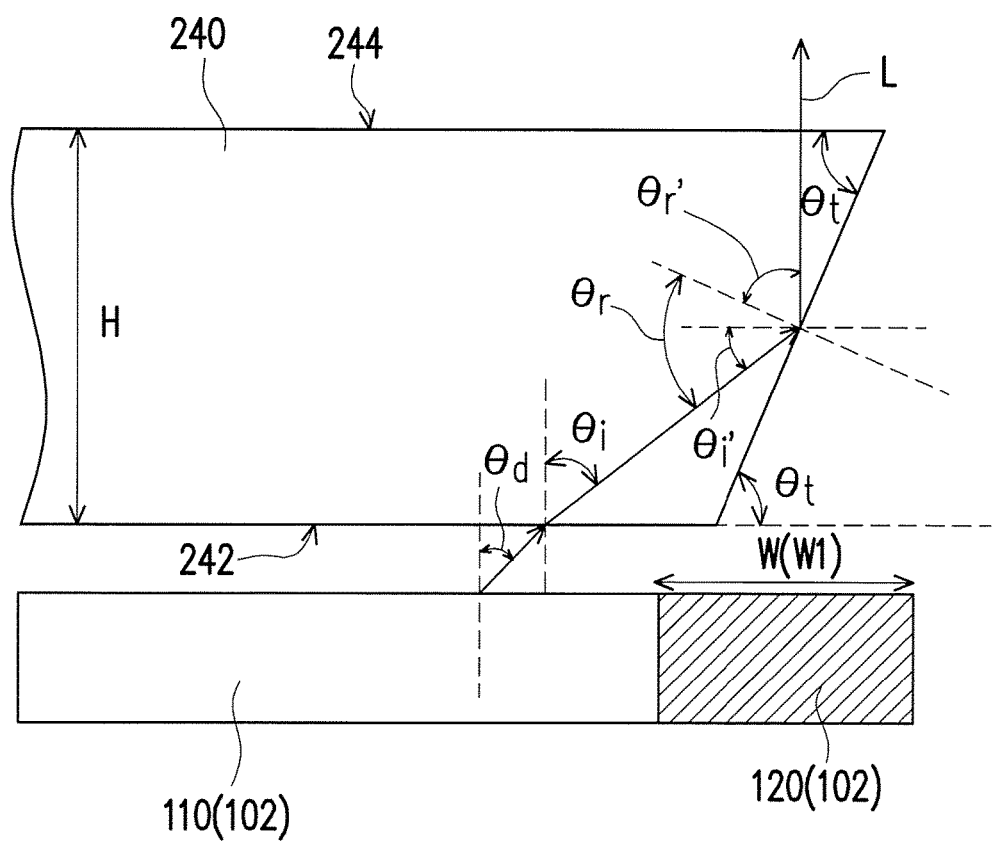
FIG. 4 is a light path schematic diagram illustrating an image light of a display apparatus of the embodiment of FIG. 3A.

FIG. 4 is a light path schematic diagram illustrating an image light of a display apparatus of the embodiment of FIG. 3A. Some of the components in FIG. 4 are illustrated as the exploded diagram so that the light path (such as the light path of the image light Lf in FIG. 3A) of a portion of the image light L of the display apparatus is illustrated, and the relation between the inclined angle $\theta_r$ of the transparent element 240 and the thickness H of the transparent element 240 is exemplarily illustrated. Please referring to FIG. 4, in the embodiment, the incident angle of the image light L entering the light entering surface 242 has an angle $\theta_d$, the refraction angle of the image light L entering the light entering surface 242 has angle $\theta_l$. The incident angle of the image light L reflected on the inclined surface IS (side surface 246) has an angle $\theta_r$, and the reflection angle of the image light L reflected on the inclined surface IS has an angle $\theta_{r'}$. In addition, the angle of the image light L emitting toward the inclined surface IS and the horizontal plan (such as the plan paralleled to the light entering surface 242) has an angle $\theta_i$.

In the embodiment, the angle $\theta_{r'}$ is equal to the inclined angle $\theta_t$, and the angle $\theta_r$ is equal to the $\theta_{r'}$. In addition, $\theta_i = \theta_r - (90 - \theta_t) = 2 \times \theta_t - 90$, then the following correlation can be obtained:

$$\theta_i = 90 - \theta_i = 180 - 2 \times \theta_t \quad (11)$$

In addition, because $na \times \sin(\theta_d) = nc \times \sin(\theta_i)$, then the following correlation can be obtained:

$$\theta_d = a\sin\left(\frac{nc \times \sin(\theta_i)}{na}\right) \quad (12)$$

Wherein, na is the refractive index of air, and nc is the refractive index of the transparent element 240.

Based on the above correlation (11) to (12), the following correlation can be obtained:

$$\theta_d = a\sin\left(\frac{nc \times \sin(180 - 2 \times \theta_t)}{na}\right) \quad (13)$$

For example, when the refractive index nc is 1.49 and $\theta_t$ is 72 degrees, the angle $\theta_d$ is 61 degrees. According to the previous calculation, if the transparent element 240 doesn't have the inclined surface IS, the angle of the image light L able to be used by the corner prism set 232 is 26.8 degrees, and when the width W of the frame area 120 is 4 millimeter, for example, the thickness H of the transparent element 240 is 12.6 millimeter. Relatively, the transparent element 240 in the embodiment has the inclined surface IS, so the angle of the image light L able to be used by the corner prism set 232 is $\theta_d$, that is, 61 degrees. Specifically, the thickness H of the transparent element 240 and the angle $\theta_d$ has a correlation as described in correlation (10). When the width W is 4 millimeter, for example, and the angle $\theta_d$ is 61 degrees, the thickness H of the transparent element 240 is 5.5 millimeter. That is, because the transparent element 240 of the embodiment has the inclined surface IS, the transparent element 240 can merely adopt the thickness H of 5.5 millimeter. Compared to the circumstance of the transparent element 140 not having the inclined surface IS (thickness H is 12.6 millimeter), the thickness of the transparent element 240 of the embodiment can be reduced by more than half of the original thickness.

Specifically, in the related embodiments, the transparent element 240 of the display apparatus 200 in the embodiment of FIG. 3A can be manufactured to be thinner than the transparent element 140 of the display apparatus 100 in the embodiment of FIG. 1A. Furthermore, because the prism module 230 is not disposed on the third light exiting region R3 of the display apparatus 200, so, compared to the display apparatus 100, the prism module 230 with a smaller surface area can be disposed on the display apparatus 200, and the cost-effectiveness is provided. However, the prism module 130 of the display apparatus 100 in the embodiment of FIG. 1A can be manufactured on the second light exiting region R2 and the third light exiting region R3 by the method of entire surface attachment, the manufacturing process of blocking the third light exiting region R3 through the alignment achieved by the fixture is avoided. Therefore, the display apparatus 100 is manufactured more easily compared to the display apparatus 200.

In summary, the embodiments of the invention have at least one of the advantages or effects below. In the display apparatus of the embodiment of the invention, at least one of the corner prism set of the prism module is disposed on at least one of the corner regions, and the transparent element is disposed between the display device and the prism module and covering the corner regions. In addition, at least one of the side surfaces of the transparent element located in the corner region is inclined surface. The light entering surface connected to the inclined surface is retracted a direction toward the display area, and the inclined surface and the light exiting surface have an inclined angle. Therefore, the image light of the display device can forward emit through the transparent element and the prism module at the top of the frame area of the display device, so as to achieve the borderless display effect, and the dark area situation won't occur at the corner of the display apparatus. In addition, because the inclined surface can adjust the transmission direction of the image light, the thickness of the transparent element can be designed to be thinner, so as to make the display apparatus have a thinner thickness.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Moreover, "first", "second", etc. mentioned in the specification and the claims are merely used to name the elements and should not be regarded as limiting the upper or lower bound of the number of the components/devices.

What is claimed is:

1. A display apparatus, comprising:
    a display device having a display area and a frame area surrounding the display area, wherein the display area comprises a plurality of corners, the frame area comprises a plurality of corner regions, and the corner regions are adjacent to the corners respectively;
    a prism module comprising at least one corner prism set, wherein each of the at least one corner prism set is disposed on one of the corner regions respectively; and
    a transparent element disposed between the display device and the prism module and covering the corner regions, wherein the transparent element comprises a light entering surface facing the display device, a light exiting surface opposite to the light entering surface, and a plurality of side surfaces connected to the light entering surface and the light exiting surface, wherein at least one of the side surfaces located in the corner regions is an inclined surface, the light entering surface connected to the inclined surface is retracted in a direction toward the display area, and an inclined angle is provided between the inclined surface and the light exiting surface,
    wherein each of the corner prism set comprises a plurality of prisms, and the prisms are arranged along an arrangement direction away from the corner of the display area, wherein the light exiting surface has a first light exiting region, a second light exiting region, and a third light exiting region, the first light exiting region is located on the display area, the third light exiting region is located on the frame area, and the second light exiting region is located between the first light exiting region and the third light exiting region, wherein the prism module is located on the second light exiting region, the display device is configured to provide an image light, a first portion of the image light emits through the first light exiting region, a second portion of the image light emits through the second light exiting region and enters the prism module, and a third portion of the image light emits through the third light exiting region after being reflected by the inclined surface, wherein the inclined angle is between 45 degrees and 85 degrees.

2. The display apparatus according to claim 1, wherein an emitting direction of the third portion of the image light in the third light exiting region is perpendicular to the light exiting surface.

3. The display apparatus according to claim 1, wherein the prism module is further located on the third light exiting region, and the third portion of the image light emitting through the third light exiting region after being reflected by the inclined surface enters the prism module.

4. The display apparatus according to claim 1, wherein at One of the corner regions and the display area adjacent to the corner region, the width of the third light exiting region in the arrangement direction is greater than 0 and less than or equal to the width of the frame area in the arrangement direction.

5. The display apparatus according to claim 1, wherein an extending direction of each of the prisms is inclined with respect to a plurality of edges adjacent to the corner in the display area.

6. The display apparatus according to claim 5, wherein the angle between the extending direction and one of the edges is greater than or equal to 15 degrees and less than or equal to 75 degrees.

7. The display apparatus according to claim 1, wherein the display area further comprises a plurality of edges, the frame area further comprises a plurality of edge regions, the edge regions are adjacent to the edges respectively, the prism module further comprises a plurality of edge prism sets, and the edge prism sets are disposed on the edge regions respectively and disposed next to the edges of the display area, wherein each of the corner prism sets is located between two of the adjacent edge prism sets.

8. The display apparatus according to claim 1, wherein at least two opposite side surfaces of the side surfaces of the transparent element are the inclined surface respectively, the light entering surface connected to the inclined surface is retracted in a direction toward the display area, and the inclined angle is provided between the inclined surface and the light exiting surface.

9. The display apparatus according to claim 1, wherein the prism module is glued on the transparent element.

10. The display apparatus according to claim 9, wherein the transparent element is at least partially glued on the display device.

11. A display apparatus, comprising:
a display device having a display area and a frame area surrounding the display area, wherein the display area comprises a plurality of corners, the frame area comprises a plurality of corner regions, and the corner regions are adjacent to the corners respectively;

a prism module comprising at least one corner prism set, wherein each of the at least one corner prism set is disposed on one of the corner regions respectively; and a transparent element disposed between the display device and the prism module and covering the corner regions, wherein the transparent element comprises a light entering surface facing the display device, a light exiting surface opposite to the light entering surface, and a plurality of side surfaces connected to the light entering surface and the light exiting surface, wherein at least one of the side surfaces located in the corner regions is an inclined surface, the light entering surface connected to the inclined surface is retracted in a direction toward the display area, and an inclined angle is provided between the inclined surface and the light exiting surface, wherein each of the corner prism set comprises a plurality of prisms, and the prisms are arranged along an arrangement direction away from the corner of the display area, wherein the light exiting surface has a first light exiting region, a second light exiting region, and a third light exiting region, the first light exiting region is located on the display area, the third light exiting region is located on the frame area, and the second light exiting region is located between the first light exiting region and the third light exiting region, wherein the prism module is located on the second light exiting region, the display device is configured to provide an image light, a first portion of the image light emits through the first light exiting region, a second portion of the image light emits through the second light exiting region and enters the prism module, and a third portion of the image light emits through the third light exiting region after being reflected by the inclined surface, wherein an emitting direction of the third portion of the image light in the third light exiting region is perpendicular to the light exiting surface.

12. A display apparatus, comprising:
a display device having a display area and a frame area surrounding the display area, wherein the display area comprises a plurality of corners, the frame area comprises a plurality of corner regions, and the corner regions are adjacent to the corners respectively;

a prism module comprising at least one corner prism set, wherein each of the at least one corner prism set is disposed on one of the corner regions respectively; and a transparent element disposed between the display device and the prism module and covering the corner regions, wherein the transparent element comprises a light entering surface facing the display device, a light exiting surface opposite to the light entering surface, and a plurality of side surfaces connected to the light entering surface and the light exiting surface, wherein at least one of the side surfaces located in the corner regions is an inclined surface, the light entering surface connected to the inclined surface is retracted in a direction toward the display area, and an inclined angle is provided between the inclined surface and the light exiting surface, wherein each of the corner prism set comprises a plurality of prisms, and the prisms are arranged along an arrangement direction away from the corner of the display area, wherein the light exiting surface has a first light exiting region, a second light exiting region, and a third light exiting region, the first light exiting region is located on the display area, the third light exiting region is located on the frame area, and the second light exiting region is located between the first light exiting region and the third light exiting region, wherein the prism module is located on the second light exiting region, the display device is configured to provide an image light, a first portion of the image light emits through the first light exiting region, a second portion of the image light emits through the second light exiting region and enters the prism module, and a third portion of the image light emits through the third light exiting region after being reflected by the inclined surface, the prism module is further located on the third light exiting region, and the third portion of the image light emitting through the third light exiting region after being reflected by the inclined surface enters the prism module.

13. The display apparatus according to claim 12, wherein the inclined angle is between 65 degrees and 88 degrees.

14. The display apparatus according to claim 12, wherein at one of the corner regions and the display area adjacent to the corner region, the display apparatus satisfies:

$$L2+L3 \leq H^*\cot(\theta)+W,$$

wherein L2 is the width of the second light exiting region in the arrangement direction, L3 is the width of the third light exiting region in the arrangement direction, H is the thickness of the transparent element, θ is an angle value of an angle of incidence of the third portion of the image light entering the prism module, and W is the width of the frame area on the arrangement direction.

15. A display apparatus, comprising:

a display device having a display area and a frame area surrounding the display area, wherein the display area comprises a plurality of corners, the frame area comprises a plurality of corner regions, and the corner regions are adjacent to the corners respectively;

a prism module comprising at least one corner prism set, wherein each of the at least one corner prism set is disposed on one of the corner regions respectively; and a transparent element disposed between the display device and the prism module and covering the corner regions, wherein the transparent element comprises a light entering surface facing the display device, a light exiting surface opposite to the light entering surface, and a plurality of side surfaces connected to the light entering surface and the light exiting surface, wherein at least one of the side surfaces located in the corner regions is an inclined surface, the light entering surface connected to the inclined surface is retracted in a direction toward the display area, and an inclined angle is provided between the inclined surface and the light exiting surface, wherein each of the corner prism set comprises a plurality of prisms, and the prisms are arranged along an arrangement direction away from the corner of the display area, wherein the display area further comprises a plurality of edges, the frame area further comprises a plurality of edge regions, the edge regions are adjacent to the edges respectively, the prism module further comprises a plurality of edge prism sets, and the edge prism sets are disposed on the edge regions respectively and disposed next to the edges of the display area, wherein each of the corner prism sets is located between two of the adjacent edge prism sets.

16. The display apparatus according to claim 15, wherein each of the corner prism sets is connected to the adjacent edge prism sets.

17. The display apparatus according to claim 15, wherein each of the edge prism sets comprises a plurality of prisms, the prisms are arranged along a direction away from the display area, and the extending directions of each of the prisms of each of the edge prism sets is substantially paralleled to the edge of the adjacent display area.

18. The display apparatus according to claim 15, wherein each of the edge prism sets comprises a plurality of prisms, a peak of each of the prisms of each of the edge prism sets faces a direction away from the display device, and a peak of each of the prisms of each of the corner prism sets faces a direction away from the display device.

* * * * *